UNITED STATES PATENT OFFICE.

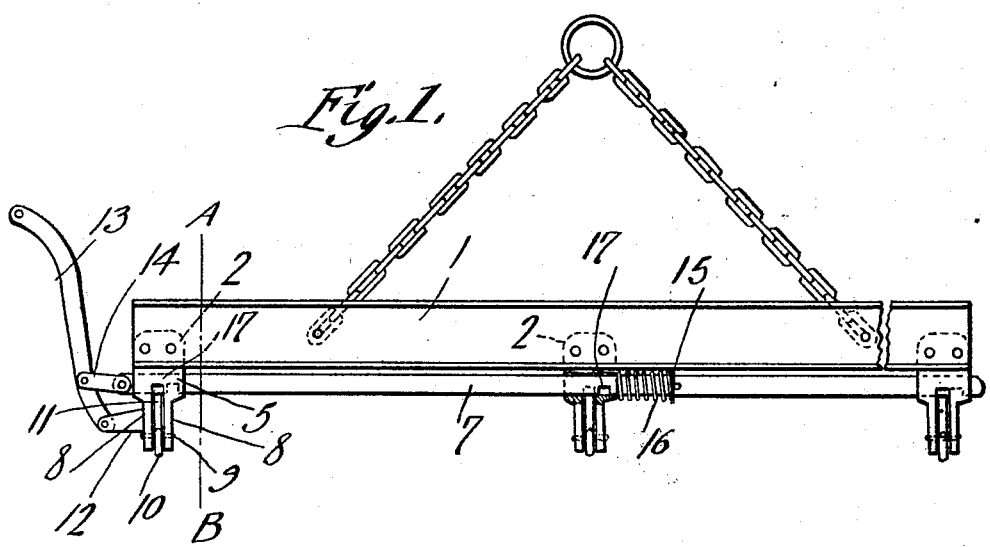
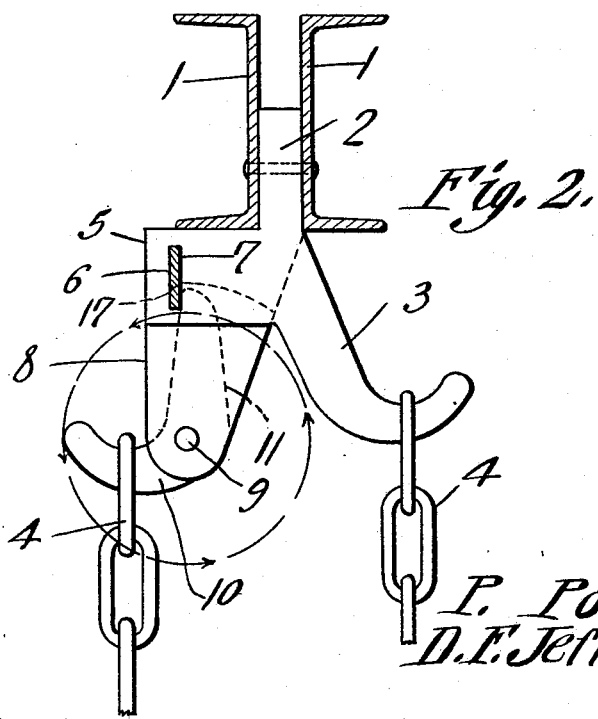

PERRY POTEET AND DANIEL FERGUSON JEFFREY, OF JEANERETTE, LOUISIANA.

SLING-TRIPPING DEVICE.

1,230,515.  Specification of Letters Patent.  Patented June 19, 1917.

Application filed May 13, 1916. Serial No. 97,367.

*To all whom it may concern:*

Be it known that we, PERRY POTEET and DANIEL F. JEFFREY, citizens of the United States, residing at Jeanerette, in the county of Iberia, State of Louisiana, have invented a new and useful Sling-Tripping Device, of which the following is a specification.

This invention relates to slings such as used in transporting and unloading sugar cane and the like, one of the objects of the invention being to provide novel means for supporting and tripping the sling, the means provided for this purpose being simple, compact and durable and easy to operate.

A further object is to provide means whereby several slings can be simultaneously released.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is an elevation of a structure constituting the present invention, a part thereof being broken away.

Fig. 2 is an enlarged section on line A—B Fig. 1 and showing the ends of a sling in engagement with the hooks.

Referring to the figures by characters of reference 1 designates opposed channel beams spaced apart by blocks 2 from each of which extends a downwardly and laterally inclined hook 3 designed to engage one end of a sling 4. A wing 5 is extended laterally from the upper portion of each hook 3 and rests against the bottom of one of the beams 1, this wing having an opening 6 for the reception of a slidable locking bar 7 extending longitudinally of the beam and through the wings 5 of all of the blocks employed. Spaced ears 8 extend downwardly from each wing 5 and carry a pivot pin 9 on which is mounted a movable hook 10 provided with an arm 11 designed to extend upwardly and to bear outwardly against the back of the bar 7.

Extending from the ear 8 adjacent one end of the beams 1 is a bracket 12 to which is connected a lever 13, this lever being coupled to the bar 7 by a link 14.

A collar 15 is secured to the bar and bearing against this collar is one end of a coiled spring 16 mounted on the bar 7, the other end of the spring bearing against the adjacent wing 5.

Notches 17 are provided in the lower edge of the bar 7 and are spaced apart distances equal to the distances between the arms 11. The spring 16 serves to hold bar 7 normally shifted in one direction with the notches 17 removed from the arms 11 so that said arms will bear outwardly against the back faces of the bar 7 and support the hooks 10 in outstanding or holding positions. These hooks are adapted to be engaged by the sling 4.

When the slings are in position on the hooks 3 and 10 they will securely hold the sugar cane or other material. However, when it is desired to release the material from the slings, lever 13 is shifted to pull through link 14 upon the bar 7. Thus the bar is shifted longitudinally against the action of the spring 16 and the notches 17 are brought simultaneously to positions in front of the arms 11. Consequently said arms will be released and hooks 10 will swing downwardly under the weight of the load carried thereby until the slings 4 slide off of the hooks. Lever 13 can then be released and spring 16 will return bar 7 and lever 13 to their normal positions. By completing the rotation of each hook 10, said hook will be caused to pass under the bar 7 and the arm 11 will be brought against the back face of said bar, the distance between the pivot 9 and the hook 3 being sufficient to allow hook 10 to be moved in this manner and as indicated by the dotted line in Fig. 2.

What is claimed is:—

1. A sling support and trip including opposed beams, spacing blocks secured therebetween, a stationary hook extending downwardly and laterally from each block, a guide wing extending laterally from each hook, a bar slidably mounted within the guide wing, a pivoted hook mounted below each wing, each hook having an arm normally bearing against the bar to hold the hook in sling engaging position, and means for shifting the bar to simultaneously release the arms and pivoted hooks.

2. A sling support and trip including opposed beams, spacing blocks secured therebetween, a stationary hook extending downwardly and laterally from each block, a guide wing extending laterally from each hook, a bar slidably mounted within the guide wing, a pivoted hook mounted below each wing, each hook having an arm normally bearing against the bar to hold the hook in sling engaging position, and means for shifting the bar to simultaneously release the arms and pivoted hooks, said bar having notched portions movable to position across the arms.

3. A sling support and trip including opposed beams, spacing blocks secured therebetween, a stationary hook extending downwardly and laterally from each block, a guide wing extending laterally from each hook, a bar slidably mounted within the guide wing, a pivoted hook mounted below each wing, each hook having an arm normally bearing against the bar to hold the hook in sling engaging position, means for shifting the bar to simultaneously release the arms and pivoted hooks, said bar having notched portions movable to position across the arms, and yielding means for automatically returning the bar to its normal position when released.

4. A sling support and trip including opposed beams, spaced blocks secured therebetween, a stationary hook extending downwardly and laterally from each block, a guide wing extending laterally from each hook, a bar slidably mounted within the guide wing, a pivoted hook mounted below each wing, each hook having an arm normally bearing against the bar to hold the hook in sling engaging position, means for shifting the bar to simultaneously release the arms and pivoted hooks, and a coiled spring surrounding the bar and engaging a guide wing to restore the bar to normal position.

5. A sling support and trip including opposed beams, and a member associated therewith comprising a spacing block portion secured between the beams, a hook depending therefrom, a laterally extending guide wing, and spaced ears depending from the guide wing, a bar slidably mounted in the guide wing, a hook pivoted in the depending ears, an arm formed on the hook and normally bearing against the bar, a sling connecting the hooks, and means for shifting the bar to release the arm and pivoted hook and open the sling.

In testimony that we claim the foregoing as our own, we have hereto affixed our signatures in the presence of two witnesses.

PERRY POTEET.
DANIEL FERGUSON JEFFREY.

Witnesses:
N. P. JEFFREY,
DANIEL JEFFREY.

Copies of this patent may be obtained for five cents each, by addressing the "Commissioner of Patents, Washington, D. C."